United States Patent
Jansa

(10) Patent No.: US 6,178,917 B1
(45) Date of Patent: Jan. 30, 2001

(54) POINTER INSTRUMENT

(75) Inventor: Frank Jansa, Frankfurt (DE)

(73) Assignee: Mannesmann VDO AG, Frankfurt (DE)

(*) Notice: Under 35 U.S.C. 154(b), the term of this patent shall be extended for 0 days.

(21) Appl. No.: 09/336,303

(22) Filed: Jun. 19, 1999

(30) Foreign Application Priority Data

Jun. 24, 1998 (DE) .............................................. 198 28 041

(51) Int. Cl.[7] .................................................. G01D 7/04
(52) U.S. Cl. .......................... 116/286; 116/288; 116/301; 362/30
(58) Field of Search ..................... 116/286, 287, 116/288, 293, 297, 300, 301, 303, 305; 362/23, 30, 27, 26, 28, 29, 32

(56) References Cited

U.S. PATENT DOCUMENTS

| | | | |
|---|---|---|---|
| 2,124,960 | * | 7/1938 | Waring et al. .................. 116/301 |
| 2,290,278 | * | 7/1942 | Failla ........................... 116/287 |
| 3,041,997 | * | 7/1962 | Hartwell ........................ 116/293 |
| 4,170,132 | | 10/1979 | Serley . |
| 4,252,078 | * | 2/1981 | Fukasawa et al. ............... 116/288 |
| 4,380,043 | * | 4/1983 | Takamatsu et al. ............. 362/26 |
| 5,546,888 | | 8/1996 | Skiver . |

FOREIGN PATENT DOCUMENTS

| | | |
|---|---|---|
| 2839196 | 3/1979 | (DE) . |
| 3150943 | 6/1983 | (DE) . |
| 3626957 | 2/1988 | (DE) . |
| 3824391 | 1/1990 | (DE) . |
| 3906721 | 9/1990 | (DE) . |
| 0492543 | 7/1992 | (EP) . |
| 0536485 | 4/1993 | (EP) . |
| 08062252 | 3/1996 | (JP) . |
| 9749090 | 12/1997 | (WO) . |

* cited by examiner

Primary Examiner—Andrew H. Hirshfeld
(74) Attorney, Agent, or Firm—Martin A. Farber

(57) ABSTRACT

A pointer instrument (1) has two pointer flags (3, 4) which can pivot in a common plane about a common axis (2). For this purpose, the pointer flags (3, 4) can each be deflected independently of each other in the region of a separate sector of a circle by a pointer drive (6, 6'), by of a mechanism (5, 5'). By this means, the pointer instrument (1) has a compact overall size and, at the same time, is easy to read.

11 Claims, 5 Drawing Sheets

POINTER INSTRUMENT

FIELD AND BACKGROUND OF THE INVENTION

The invention relates to a pointer instrument, especially one for a motor vehicle, having two pointers which can each be deflected by a pointer drive and each have a pointer flag, it being possible for the pointers to pivot independently of each other about a common axis of rotation.

In modern motor vehicles, a large number of items of information are signaled to the driver by pointer instruments. Whereas earlier one was satisfied with just a speed indicator, pointer instruments are also increasingly provided nowadays for the engine speed, the fuel level or the temperature. For traffic safety reasons, these instruments must be arranged in the continuous field of view of the driver as a result of which the installation space which is available is often severely restricted.

It has therefore already been proposed to integrate two independent, coaxial pointers into one pointer instrument, similar to a clock, in order in this way to make optimum use of the available space. However, the disadvantage here is that, depending on the position of the pointer flags, the lower pointer flag is hidden by the upper pointer flag and therefore cannot be read directly by the driver. As a result, in the event of a fleeting glance at the pointer instrument, confusion in the allocation of the pointer flag may occur. Furthermore, the above-described design requires multiple scaling, so that increased attention is required of the driver for the purpose of reading. The inherent advantage of pointer instruments over digital indicators, that changes in the indicated value can be registered without the indicator having to be read exactly for this, is therefore no longer provided in the case of two coaxial pointer flags. Furthermore, the relatively great distance of the upper pointer from the dial has a detrimental effect so that reading inaccuracies occur, depending on the viewing angle, and the pointer instrument has a large overall height. In practice, the abovementioned disadvantages have led to pointer instruments with a plurality of pointer flags not being able to become widespread, with the exception of pointer instruments for the time of day.

SUMMARY OF THE INVENTION

The invention is based on the problem of configuring a pointer instrument with two pointer flags, wherein each pointer flag has a reading accuracy that essentially unchanged as compared with conventional pointer instruments equipped with only one pointer flag. At the same time, the intention is, in particular, to eliminate erroneous allocations of the pointer flag to the associated scale.

According to the invention, this problem is solved by the pointer flags being essentially arranged in a common plane and in each case so that they can pivot in a region which is formed by a sector of a circle whose center is arranged on the axis of rotation. The arrangement of the pointer flags in one plane permits, on the one hand, quick and fault-free assignment of the pointer position to the associated scale and, on the other hand, at the same time a space-saving low design. The pointer flags can each pivot in a separate sector of a circle, so that overlapping of the pointer flags is ruled out. In principle, the number of pointer flags designed in this way is any desired, the recommendation in practice being up to a maximum of four pointer flags, for reasons of clarity.

The common axis of rotation, about which the pointer flags are arranged so that they can pivot, can be aligned essentially perpendicular to the plane of a dial and permanently connected to the instrument housing. However, one embodiment of the invention, in which the common axis is designed as a pointer shaft of one of the pointer flags, is particularly advantageous. The other or the further pointer flags are in this case arranged in relation to the pointer shaft so that they can pivot around the latter. This achieves a compact design which at the same time also offers the possibility of supplementing existing pointer instruments with additional pointers. In this case, the pointer flags are arranged so that they can pivot independently of one another.

A particularly advantageous embodiment of the invention is also provided when the pointer flags can be deflected by means of a form-fitting mechanism. This permits exact and fault-free transmission of the position of the respective pointer drive system to the pointer shaft and, respectively, to the pointer flag. In this case, in particular, displacements of the zero point on account of slip are ruled out.

Particularly beneficial for this purpose is a development of the invention in which the mechanism is a gear mechanism. This permits reliable deflection of the pointer flag to be achieved using simple means, it being possible for any step-up or step-down ratios to be achieved between the gear wheels of the gear mechanism. In this case, the gearwheels may also be designed, for example, in the form of sectors of a circle with an opening angle needed to deflect the pointer flag.

It is also advantageous if the mechanism is equipped with gearwheels that are prestressed toward one other. This prestress allows play, which interferes with the reading accuracy, to be avoided. As a result, in particular any reversal of the direction of rotation can be detected more quickly and is displayed in a fault-free manner.

Another, Particularly advantageous form of the development of the invention is also provided if the mechanism is a toothed-belt mechanism. This permits the implementation of a design which is simultaneously space-saving and compact. At the same time, the transmission of force takes place without play, so that it is possible to dispense with an additional tensioning means.

Another, particularly advantageous embodiment of the invention is provided by the pointer flags being designed to be transparent in at least one sub-area. This permits the reading accuracy to be improved significantly, since even regions of the dial which are completely or partially hidden by the pointer flag can be read.

The pointer flags are preferably designed to conduct light and to couple light out in at least one sub-area, as a result of which the illumination of the pointer flags, which considerably improves the readability of the pointer instrument, in particular when the surroundings are dark, is made possible. In this case, a particularly beneficial embodiment may be achieved by the pointer flags each being designed to be illuminated by means of a light-injection element. As a result, the respectively illuminated pointer flag stands out clearly visibly against the dial. In this case, it is easily possible to illuminate the different pointer flags with different colors, so.that confusion is ruled out by the color contrast. Also conceivable are embodiments in which the illumination of the pointer flags is variable in terms of lightness or color, depending on the deflection angle, and thus, for example, a deviation from a desired value can be detected immediately.

One could imagine designing the light-injection element as a disk arranged concentrically with the axis of rotation. However, the element is particularly light—and hence the torque to be applied by the pointer drive is comparatively low—and the light losses in the light-injection element is low if, according to another advantageous development of the invention, the light-injection element has a cross section in the form of an annular segment, the center of the annular segment being arranged approximately on the axis of rotation.

The light to be radiated into the pointer by a light source is utilized to a particularly high extent if a source radiating light into the light-injection element is arranged opposite the light-injection element on a circuit board belonging to the pointer instrument. In this way, the pointer instrument also has a very compact construction.

Another particularly favorable embodiment is provided by the pointer flags each having a light source radiating in directly. By this means, a light-injection point, needed in each case for a pointer flag, can be dispensed with, and thus the dimensions of the pointer instrument can be considerably reduced. For this purpose, the common pivot axis can be provided, for example, with appropriate wiping contacts, so that a simple construction is made possible.

BRIEF DESCRIPTION OF THE DRAWINGS

The invention permits various embodiments. In order to illustrate its basic principle further, three of these embodiments are illustrated in the drawing and will be described below. In the drawings

DETAILED DESCRIPTION OF THE PREFERRED EMBODIMENTS

Figure 1:
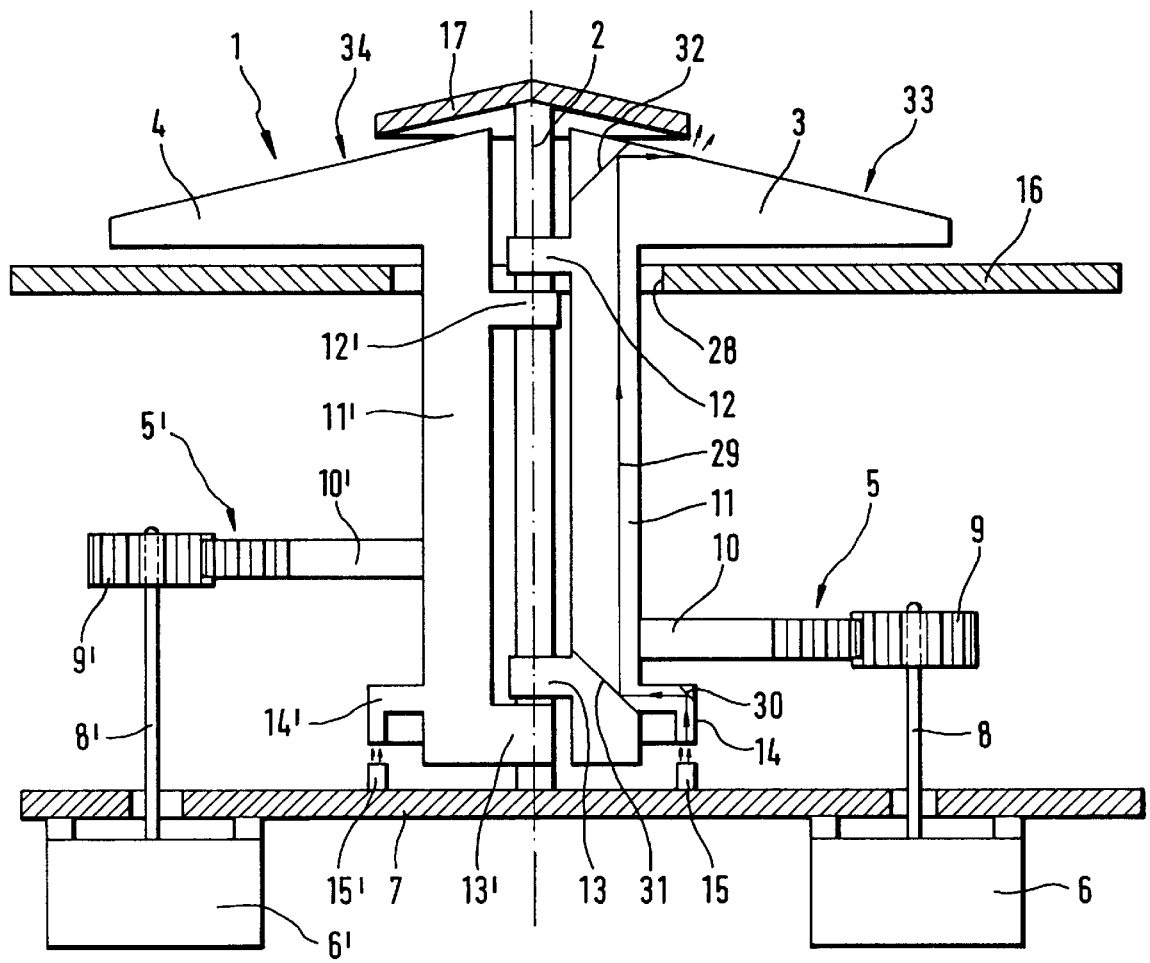
FIG. 1 shows a side, partly sectioned illustration of a pointer instrument according to the invention.

FIG. 1 shows a partly sectioned side view of a pointer instrument 1 having two pointer flags 3, 4 which can pivot about a common axis 2 and belong to pointers 33, 34. The two pointer flags 3, 4 can in each case be deflected, independently of each other, by means of a mechanism 5, 5' designed as a gear mechanism. For this purpose, the pointer instrument 1 has one each of a pointer drive 6, 6', which is arranged on the rear side of a circuit board 7 and in each case drives a gearwheel 9, 9' by means of a drive shaft 8, 8'. The gearwheel 9 or 9' engages in each case in a toothed disk 10, 10', which is in the form of a sector of a circle and which is connected in each case to a vertical support arm 11, 11' for the pointer flags 3, 4. The support arm 11, 11' of the pointer 33 or 34 has in each case an upper bearing point 12, 12' and a lower bearing point 13, 13' , which engage around the common axis 2 and permit the pointer flags 3, 4 to be deflected. The support arm 11, 11' is also connected to a light-injection element 14, 14' which is designed for the purpose of introducing light radiated by a light source 15, 15' into the support arm 11, 11', which is designed as a light conductor, and into the pointer flags 3, 4, which conduct light and couple light out. A light path 29 from the light source 15 into the pointer flag 3, via deflection surfaces 30, 31, 32 in the light-injection element 14 and in the support arm 11, is illustrated by way of example. The light-injection element 14, 14' has a cross section in the form of a segment of a circle, so that when the support arm 11, 11' pivots about the axis 2, the light-injection element 14, 14' is positioned directly above the light source 15, 15' in every angular position.

The two pointer flags 3, 4 are located in a common plane parallel to a dial 16; the pivoting regions of the pointer flags 3, 4 do not intersect one another. At its upper end, the common axis 2 bears a covering cap 17 which hides the central bearing components, as well as a recess in the dial 16 through which the support arm 11, 11' passes, from a possible observer, and is fastened rigidly to the circuit board 7.

Figure 2:
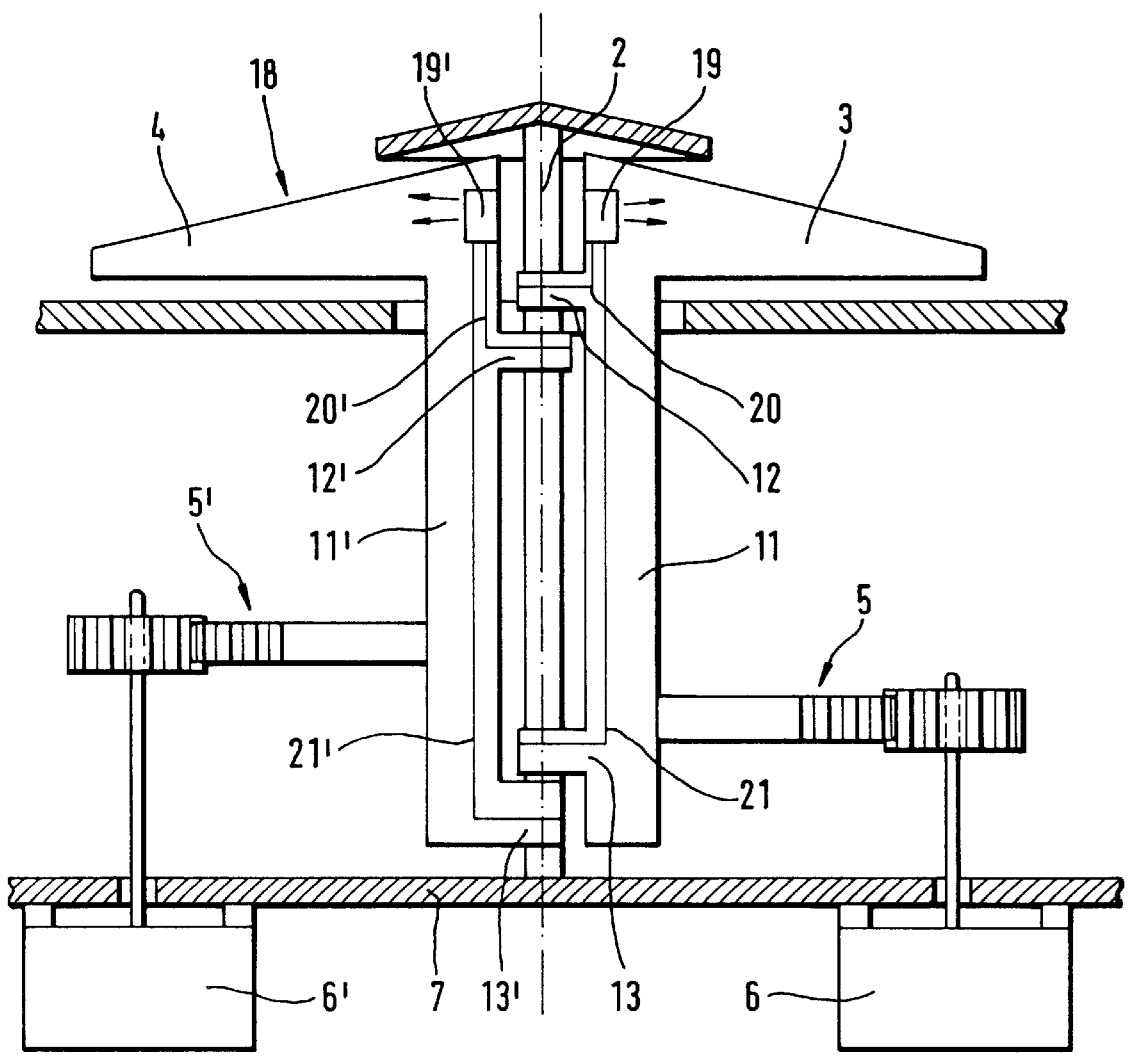
FIG. 2 shows a side, partly sectioned illustration of the pointer instrument illustrated in FIG. 1 in a modified embodiment.

FIG. 2 shows a side view of a pointer instrument 18 which is only slightly modified by comparison with the pointer instrument 1 shown in FIG. 1. In this case, pointer flags 3, 4 which are designed to be essentially transparent, conduct light and couple light out, each carry at their end facing away from a common axis 2 a light source 19, 19' which is formed by an LED and by means of which the pointer flags 3, 4 can be illuminated directly and independently of each other. For this purpose, the respective light source 19, 19' is provided in each case with two electrical contact-making means 20, 21, 20', 21', which, in each case in the region of an upper bearing point 12, 12' and a lower bearing point 13, 13', are connected by means of a wiping contact (not illustrated) with an electrical contact means which is fitted to the common axis 2. In line with the pointer instrument 1 illustrated in FIG. 1, the pointer instrument 18 has one each of a pointer drive 6, 6' which is connected to a circuit board 7 and which, by means of a mechanism 5, 5', deflects a support arm 11, 11' respectively accommodating one of the pointer flags 3, 4.

Figure 3:
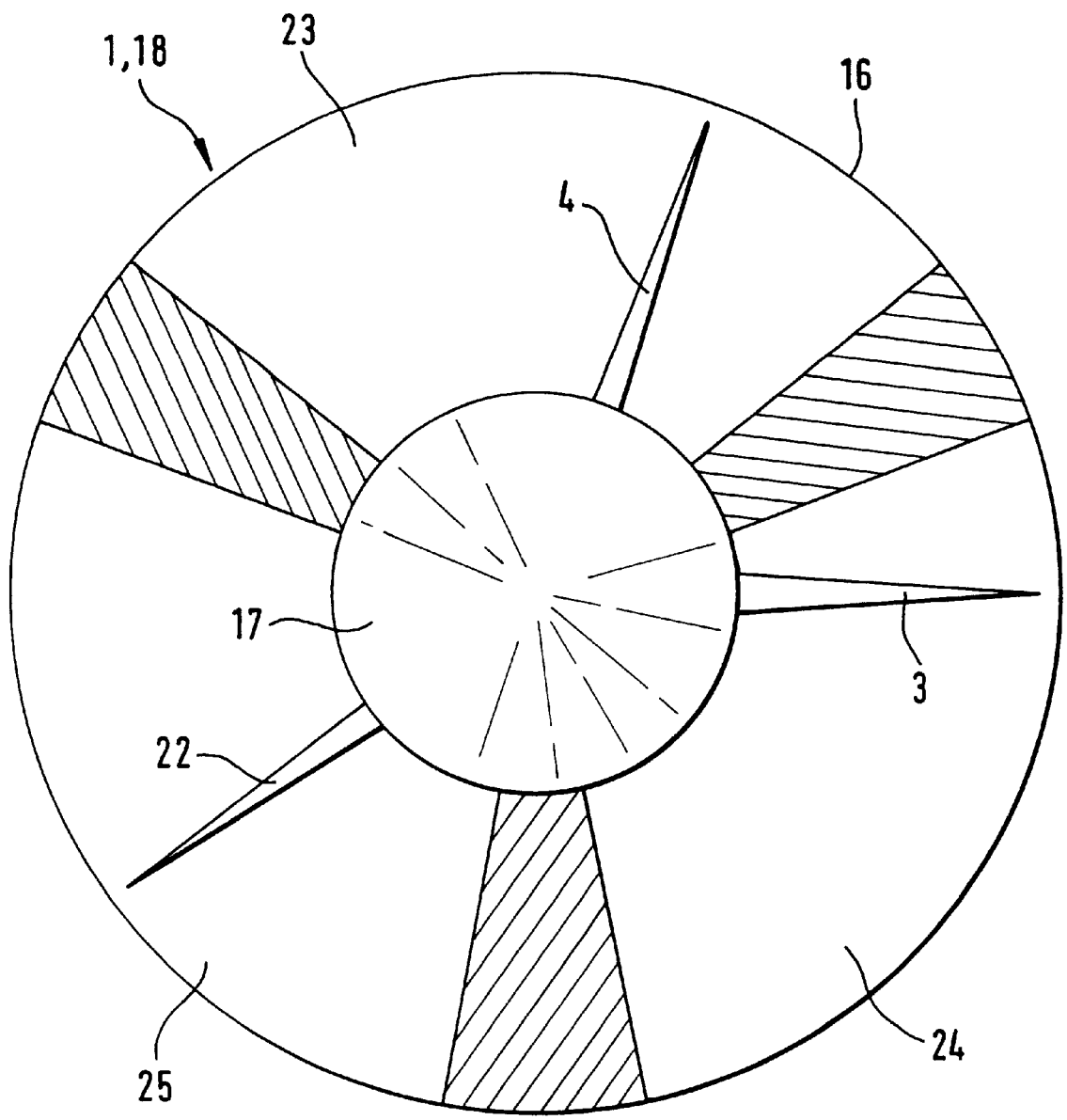
FIG. 3 shows a plan view of a pointer instrument according to FIGS. 1 or 2.

FIG. 3 shows a plan view of a pointer instrument 1 or 18 illustrated in FIG. 1 or 2 from the viewing angle of a possible observer. In addition to the pointer flags 3, 4 already illustrated in FIGS. 1 and 2, it is additionally possible to see a further pointer flag 22, the pointer flags 3, 4, 22 respectively being able to pivot in a sector of a circle 24, 23, 25 with a pivoting angle of about 100°. For this purpose, the dial 16 has respectively separate scales (not illustrated here), so that confusion is ruled out. In the operating position illustrated, the pointer flags 3, 4, 22 partly hidden by the covering cap 17 each indicate a current value which, in order to support the reading accuracy, can also be displayed with a different scaling or with sections of a different color. The pivoting ranges of the individual pointer flags 3, 4, 22 may also be of different sizes in this case, so that, for example, the pivoting range of a first pointer flag forms an angle of 180° and that of the two other pointer flags forms an angle of only 90° each.

Figure 4:
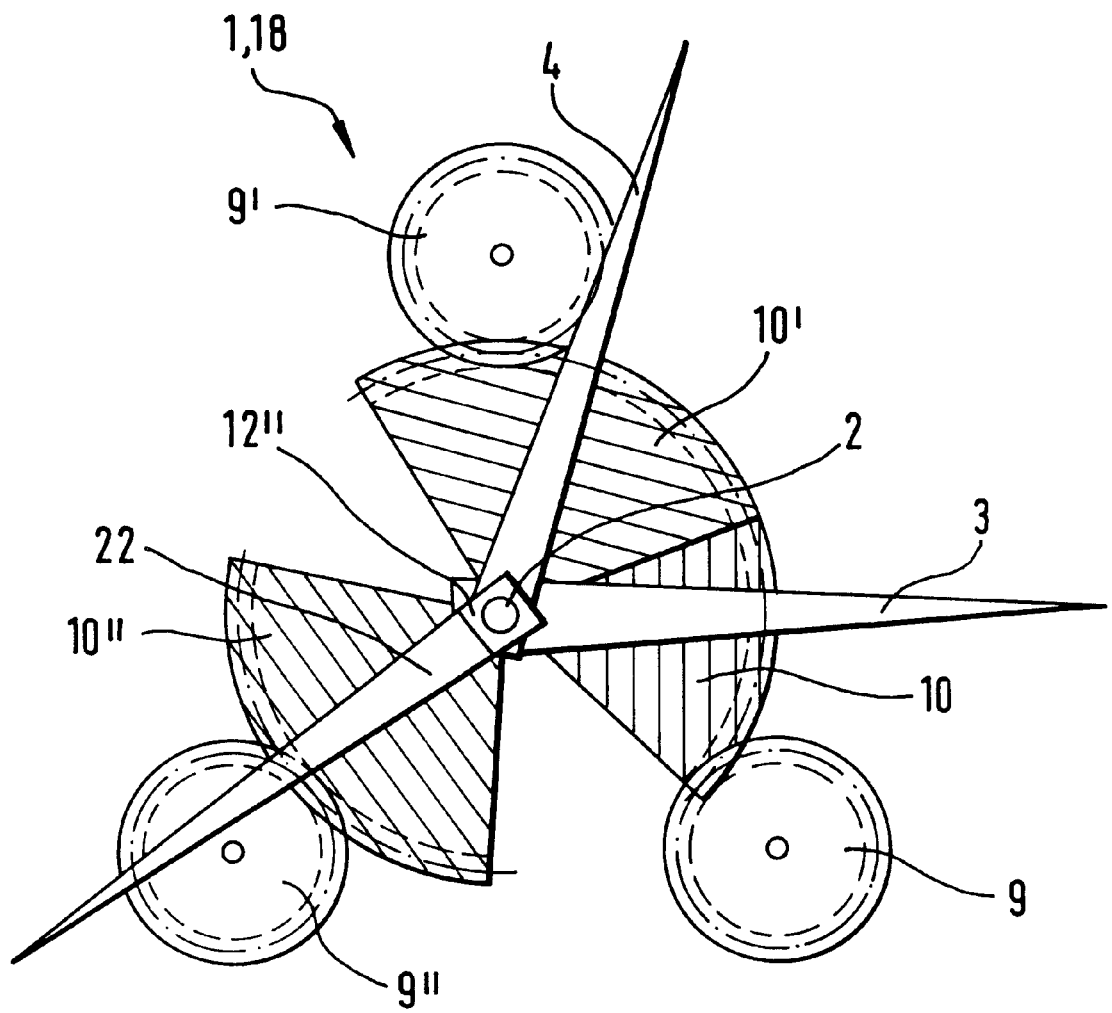
FIG. 4 shows an illustration of the principle of a pointer drive system in plan view.

FIG. 4 also shows in a plan view an illustration of the principle. of the drive of the pointer instruments 1 and 18, respectively. In this case, illustration of the dial has been omitted, so that the view of the components located underneath said dial is exposed. It is possible to see the toothed disk 10, 10', 10" which is respectively connected to a pointer flag 3, 4 and 22 and in which there engages a gearwheel 9, 9', 9" which is connected to a pointer drive (not illustrated). The respective toothed disks 10, 10', 10" of the pointer flags 3, 4 and 22 are arranged in different planes, so that their pivoting ranges can partially overlap. The upper bearing points which are connected to the respective pointer flags 3, 4, 22, of which bearing points only the bearing point 12" associated with the pointer flag 22 can be seen here, likewise engage around the common axis 2 in different planes for this purpose.

Figure 5:
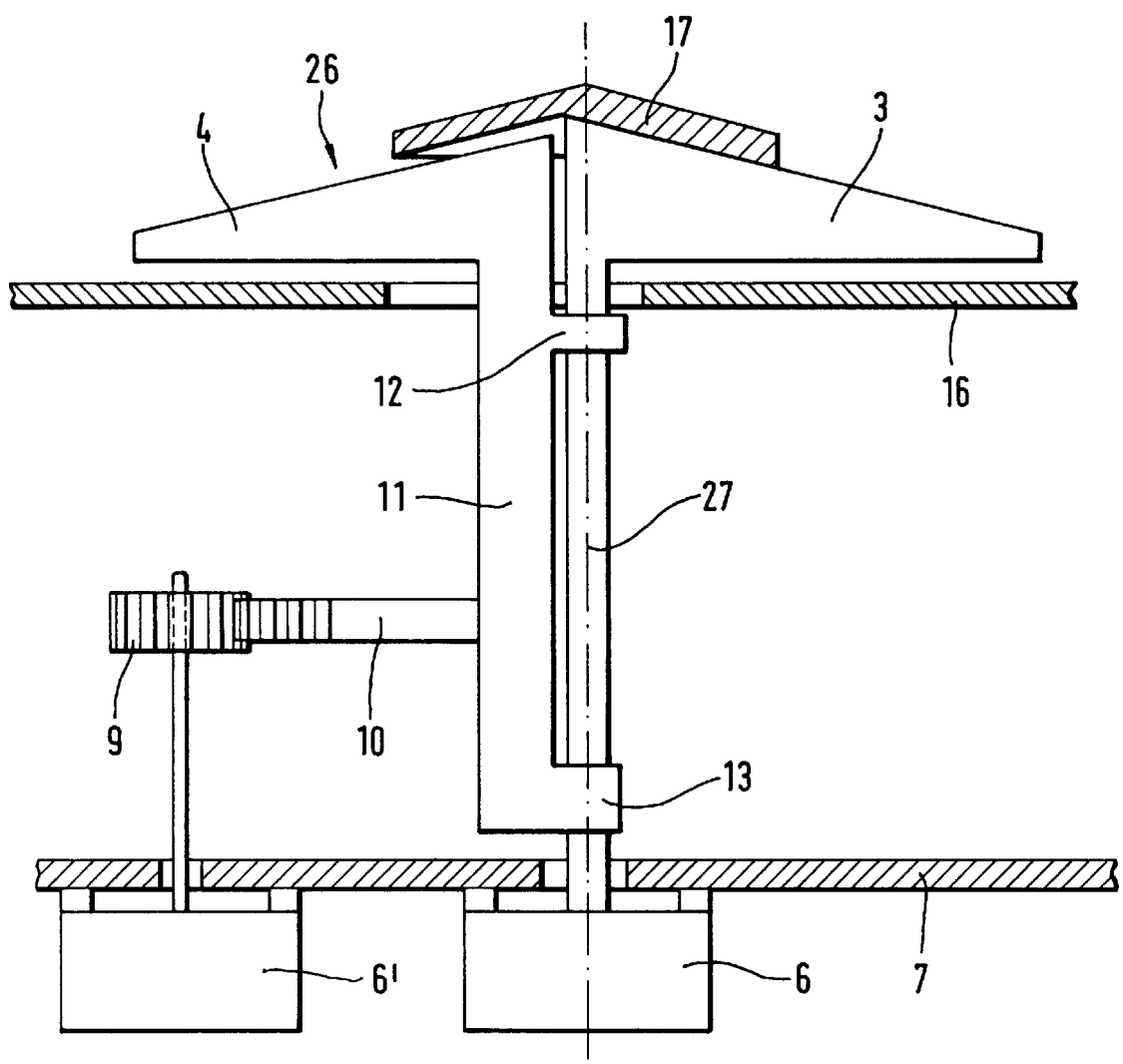
FIG. 5 shows a side, partly sectioned illustration of a further pointer instrument according to the invention.

FIG. 5 shows a further embodiment of a pointer instrument 26 according to the invention in a side, partially sectioned illustration. In this case, an upper bearing point 12, associated with a support arm 11 of a pointer flag 4, and a lower bearing point 13 engage around a pointer shaft 27 which deflects a pointer flag 3, so that the pointer shaft 27 and the support arm 11 can pivot relative to each other. For this purpose, the pointer shaft 27 is directly connected to a pointer drive 6, which is arranged on the underside of a circuit board 7. The pointer flag 4, which can pivot independently of the pointer flag 3, is connected to a toothed disk 10, in which a gearwheel 9 engages which, in turn, can be deflected by means of a pointer drive 6'. The two pointer flags 3, 4 can pivot in a common plane in front of a dial 16. The pointer flag 4 bears a covering cap 17, so that the view of the components located underneath it is blocked. This embodiment can also be fitted with a light source (not illustrated) or a light-injection point for the purpose of illumination.

Further embodiments which have more than three pointer flags can also be represented, but their number should not go beyond four for reasons of clarity. Likewise, pointer flags of different sizes or different configurations, for example bent over, are also possible, as are dials which are arranged separately and inclined with respect to the plane of the pointer flags.

What is claimed is:

1. A pointer instrument having two pointers which are pivotal by a pointer drive and each have a pointer flag in a common plane such that the pointers cannot pass over or under each other, the pointers being pivotal independently of each other about a common axis of rotation, the pointer flags each respectively being pivotal in a range formed by a separate sector of a circle (24, 23, 25) whose center is arranged on the axis of rotation (2).

2. The pointer instrument as claimed in claim 1, wherein the common axis (2) is formed as the pointer shaft (27) of one of the pointer flags (4).

3. The pointer instrument as claimed in claim 1, wherein the pointer flags (3, 4, 22) are deflected by means of a form-fitting mechanism (5, 5').

4. The pointer instrument as claimed in claim 3, wherein the mechanism (5, 5') is a gear mechanism.

5. The pointer instrument as claimed in claim 3, wherein the mechanism (5, 5') is equipped with a pair of gear mechanisms, each gear mechanism including a gearwheel prestressed towards a toothed disk.

6. The pointer instrument as claimed in claim 1, wherein the pointer flags (3, 4, 22) are partially transparent.

7. The pointer instrument as claimed in claim 1, wherein the pointer flags (3, 4) are each illuminated by a light light-injection element (14, 14').

8. The pointer instrument as claimed in claim 7, wherein each light-injection element (14, 14') has a cross section in the form of an annular segment, the center of each annular segment being arranged approximately on the axis of rotation (2).

9. The pointer instrument as claimed in claim 7, wherein a light source (15, 15') radiating light into each light-injection element (14, 14') is arranged opposite each light-injection element (14, 14') on a circuit board (7) belonging to the pointer instrument (1).

10. The pointer instrument as claimed in claim 1, wherein the pointer flags (3, 4) each have a light source (19, 19') radiating directly therein.

11. A pointer instrument comprising:

a first rotatable pointer having a pointer flag;

a second rotatable pointer having a pointer flag; and a pointer drive configured to deflect the pointers independently of each other about a common axis of rotation, wherein a portion of the flag of the first pointer is spaced equidistantly from the common axis of rotation as a portion of the flag of the second pointer, said portions of the pointer flags being arranged in a common plane essentially perpendicular to the common axis of rotation such that each pointer is limited to pivotal movement in a region formed by a sector of a circle whose center is arranged on the axis of rotation.

* * * * *